H. H. HOWE.
RAKE ATTACHMENT FOR HAY WAGONS.
APPLICATION FILED DEC. 1, 1909.
965,110.
Patented July 19, 1910.
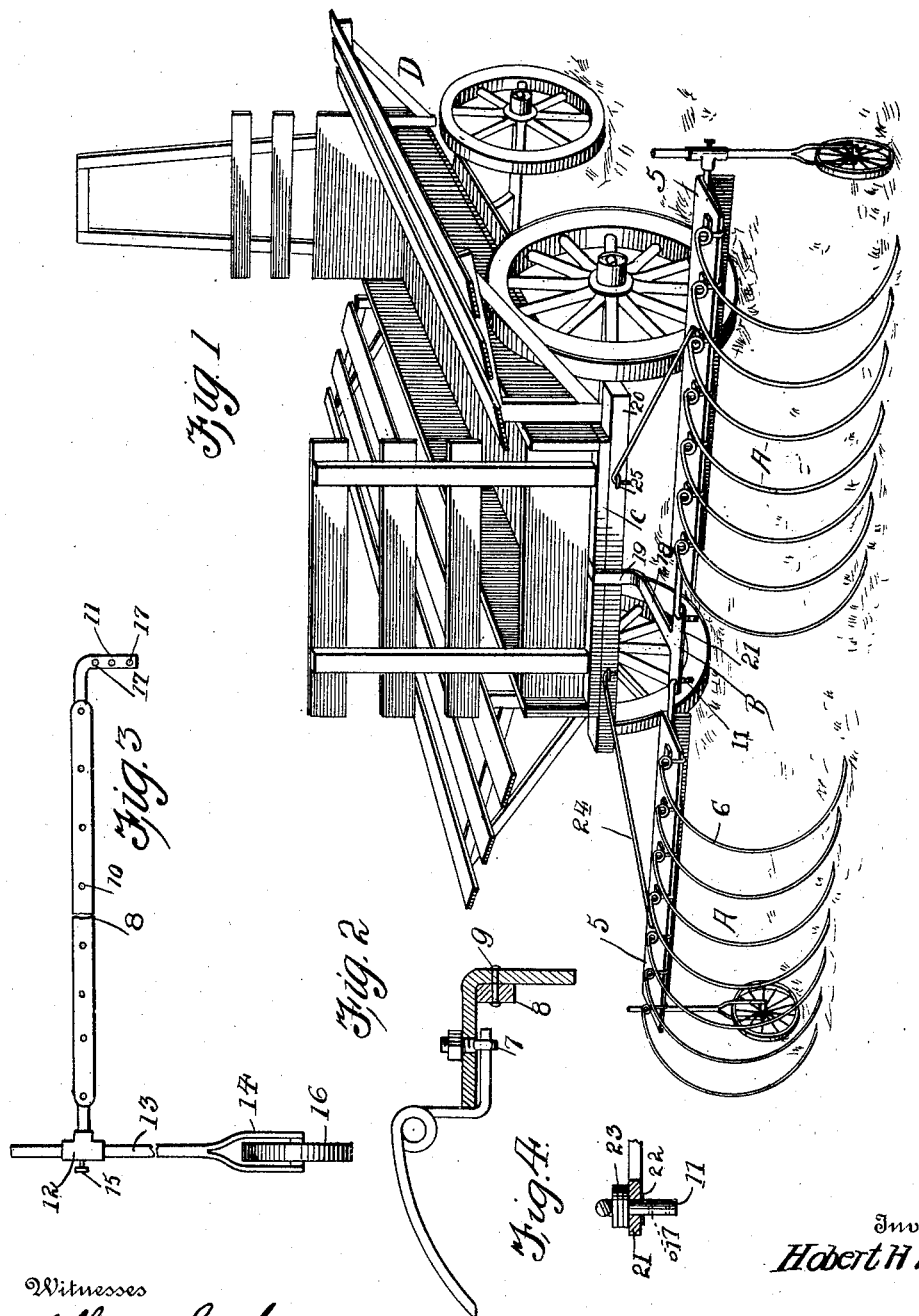

UNITED STATES PATENT OFFICE.

HOBERT H. HOWE, OF SOUTH WALPOLE, MASSACHUSETTS.

RAKE ATTACHMENT FOR HAY-WAGONS.

965,110.  Specification of Letters Patent. Patented July 19, 1910.

Application filed December 1, 1909. Serial No. 530,857.

*To all whom it may concern:*

Be it known that I, HOBERT H. HOWE, a citizen of the United States of America, residing at South Walpole, in the county of Norfolk and State of Massachusetts, have invented new and useful Improvements in Rake Attachments for Hay-Wagons, of which the following is a specification.

This invention relates to rake attachments for hay wagons, and it has among its objects to provide a simple and efficient device capable of being readily applied and detached, as occasion shall require, and by means of which hay left behind or lost by dropping off a collecting wagon will be gathered without manual labor, thus avoiding unnecessary waste.

A further object of the invention is to construct a simple and improved rake attachment equipped with means for effecting vertical adjustment and for carrying or supporting said attachment while in operation.

Still further objects of the invention are to simplify and improve the general construction and operation of a device of the character outlined above.

With these and other ends in view which will readily appear as the nature of the invention is better understood, the same consists in the improved construction and novel arrangement and combination of parts which will be hereinafter fully described and particularly pointed out in the claims.

In the accompanying drawing has been illustrated a simple and preferred form of the invention, it being, however, understood that no limitation is necessarily made to the precise structural details therein exhibited, but that changes, alterations and modifications within the scope of the invention may be resorted to when desired.

In the drawing,—Figure 1 is a perspective view, showing a hay wagon to which the invention has been applied in position for operation. Fig. 2 is a sectional view taken vertically through the rake head. Fig. 3 is a detail view in elevation illustrating one of the rake head bracing and supporting devices. Fig. 4 is a sectional detail view.

Corresponding parts in the several figures are denoted by like characters of reference.

The improved device is composed of two rake sections A, A, each comprising a rake head 5 made preferably of angle iron or steel and with which resilient rake teeth 6 have been connected by means of eye bolts 7 or in any other convenient and well known manner.

Each rake head is equipped with a brace or reinforcing device consisting of a bar 8 fitted in the angle of the rake head and secured by means of rivets or fastening devices 9 for the passage of which apertures, such as 10, are provided. The brace members are extended beyond the ends of the rake heads, each brace member being provided adjacent to what may be regarded as the inner end of the rake head with a downturned hook 11, and each brace member being provided adjacent to the outer end of the rake head with a vertical socket member 12 in which a shank 13 bifurcated at its lower end, as shown at 14, is vertically adjustable, said shank being held securely in adjusted position by means of a set screw 15, and said shank carrying at its lower bifurcated end a supporting wheel or caster 16 which is suitably mounted for rotation. The downturned hook members 11 adjacent to the inner ends of the rake heads are provided with transverse apertures 17. A supporting and attaching member B is provided, said member consisting of a T-shaped plate, the shank 18 of which is adapted to be secured upon the bottom of the bed C of an ordinary hay wagon D, said plate or attaching member projecting beyond the rear edge of the bottom C, it being provided with an offset 19 bearing against the rear edge of the wagon bed and that of the sill 20 supporting the latter. The head 21 of the T-shaped plate or member B will thus be suitably spaced from the rear end of the wagon, and said head is provided adjacent to the ends thereof with apertures for the passage of the hook members 11 adjacent to the inner ends of the rake heads, said hook members being secured by means of cotter pins 22 passing through the apertures 17. The vertical adjustment of the inner ends of the rake heads may be effected by placing washers upon the hook members 11 adjacent to the upper side of the head 21, as shown at 23, in Fig. 4 of the drawings; the outer ends of the rake head may be vertically adjusted by means of the shanks 13 of the supporting wheels or casters 16, said shanks being adjustable in the sockets 12, as previously described. Each of the rake heads is connected by a reach bar 24 with a loop or staple 25 firmly secured upon the sill 20 or in some other convenient location upon the wagon; said reach bars serving to pull the rake members along when the wagon to which the invention is applied is in motion.

As will be seen from the foregoing description, taken in connection with the drawings, the rake members may be very conveniently attached to or disconnected from a wagon which has been previously equipped with the supporting member B and with the loops or staples 25. In going to the hay field the rake members may be carried in the wagon; after arriving at the point of operation the rake members are applied in operative position, as shown in Fig. 1, and as the wagon progresses for the purpose of being loaded, any hay left over or which may accidentally topple off the wagon will be gathered by the rakes, the accumulated hay being subsequently removed by means of an ordinary hay fork, it being considered unnecessary to provide any dumping or discharging mechanism. While the load is being carried to the barn, the rake members are detached, said members being restored to the wagon when it returns to the field. It is evident that the same rake members may be used in connection with a plurality of wagons, each of which has been equipped with the supporting and attaching means, as herein described.

Having thus described the invention, what is claimed as new, is:—

1. A device of the character described comprising a rake head having a brace member projecting at both ends of the rake head and provided at one end with a downturned apertured hook and at the other end with a vertical socket member, means for supporting and for effecting vertical adjustment of the downturned hook, and a wheel-carrying shank adjustable in the vertical socket member.

2. In a device of the character described, a rake head consisting of an angle bar and having rake teeth connected therewith, a brace member extending longitudinally of the rake head being seated in the angle thereof and firmly secured upon one of the flanges, said brace member being provided at one end with a downturned apertured hook and at the other end with a vertical socket member, draft means engaging and supporting the downturned hook member, and a shank extending through and vertically adjustable in the socket member and provided at its lower end with rotary supporting means.

3. In a device of the character described, a T-shaped draft and supporting member, the head of which is provided with apertures adjacent to the ends thereof, rake members having brace rods extending beyond said heads and provided adjacent to the inner ends of the heads with downturned apertured hooks engaging the apertures in the T-shaped supporting member, said brace rods being provided adjacent to their outer ends with vertical socket members, and shanks adjustable in the latter and provided at their lower ends with rotary supporting means.

4. A rake attachment for hay wagons, the same comprising rake members, each provided adjacent to its inner end with a downturned supporting hook and adjacent to its outer end with a vertical socket member, a T-shaped attaching and supporting member secured upon the bed of a hay wagon and having a head provided with apertures adjacent to the ends thereof, said apertures being engaged by the downturned hooks adjacent to the inner ends of the rake members, shanks supported adjustably in the vertical socket members adjacent to the outer ends of the rake heads, said shanks having rotary supporting means at their lower ends, loops connected with the wagon, and reach bars connected with the rake members and having terminal downturned loop-engaging hooks.

In testimony whereof I affix my signature in presence of two witnesses.

HOBERT H. HOWE.

Witnesses:
 FRANK O. PILSBURY,
 CHARLES J. HOWE.